J. BOOTH, A. J. MILLER & W. F. BOKUM.
MACHINE FOR MAKING COTTON FELT.
APPLICATION FILED SEPT. 7, 1916.
1,287,848.
Patented Dec. 17, 1918.
4 SHEETS—SHEET 1.
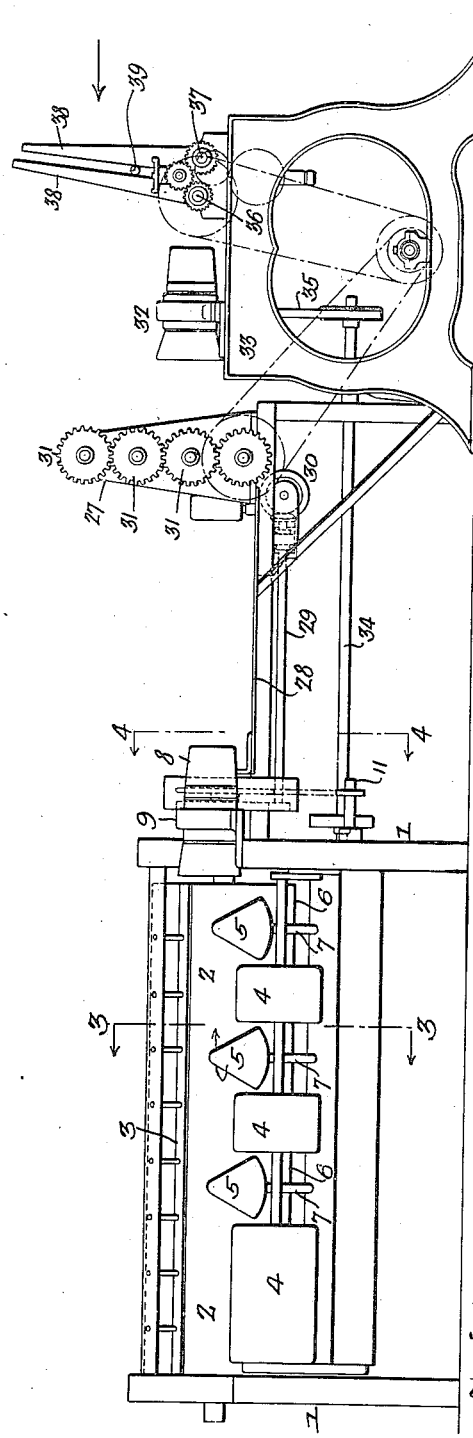
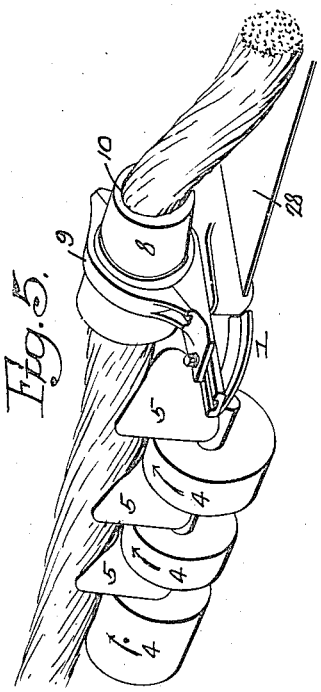
Inventors.—
James Booth,
Andrew J. Miller,
William F. Bokum.
by their Attorneys.—

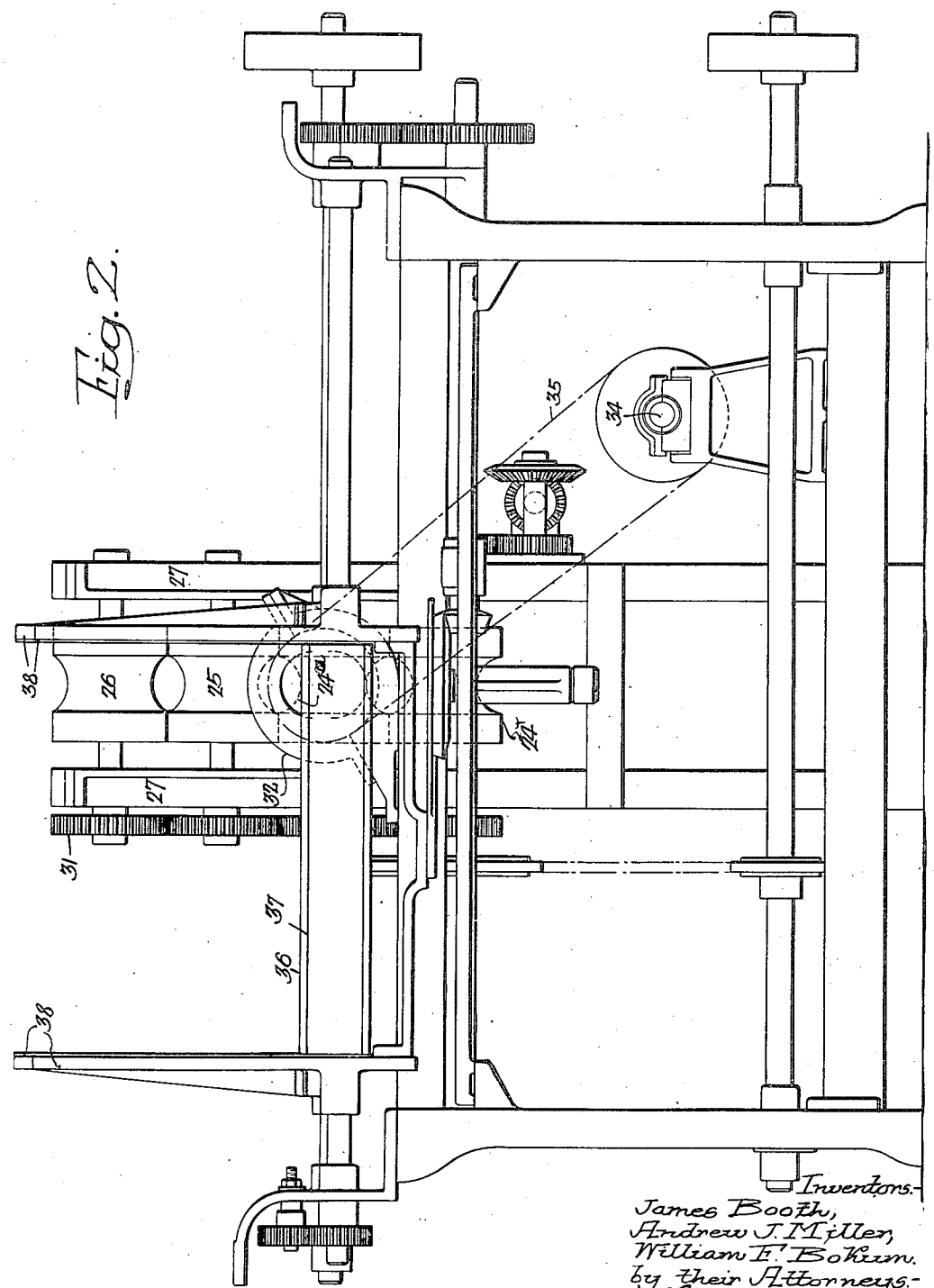

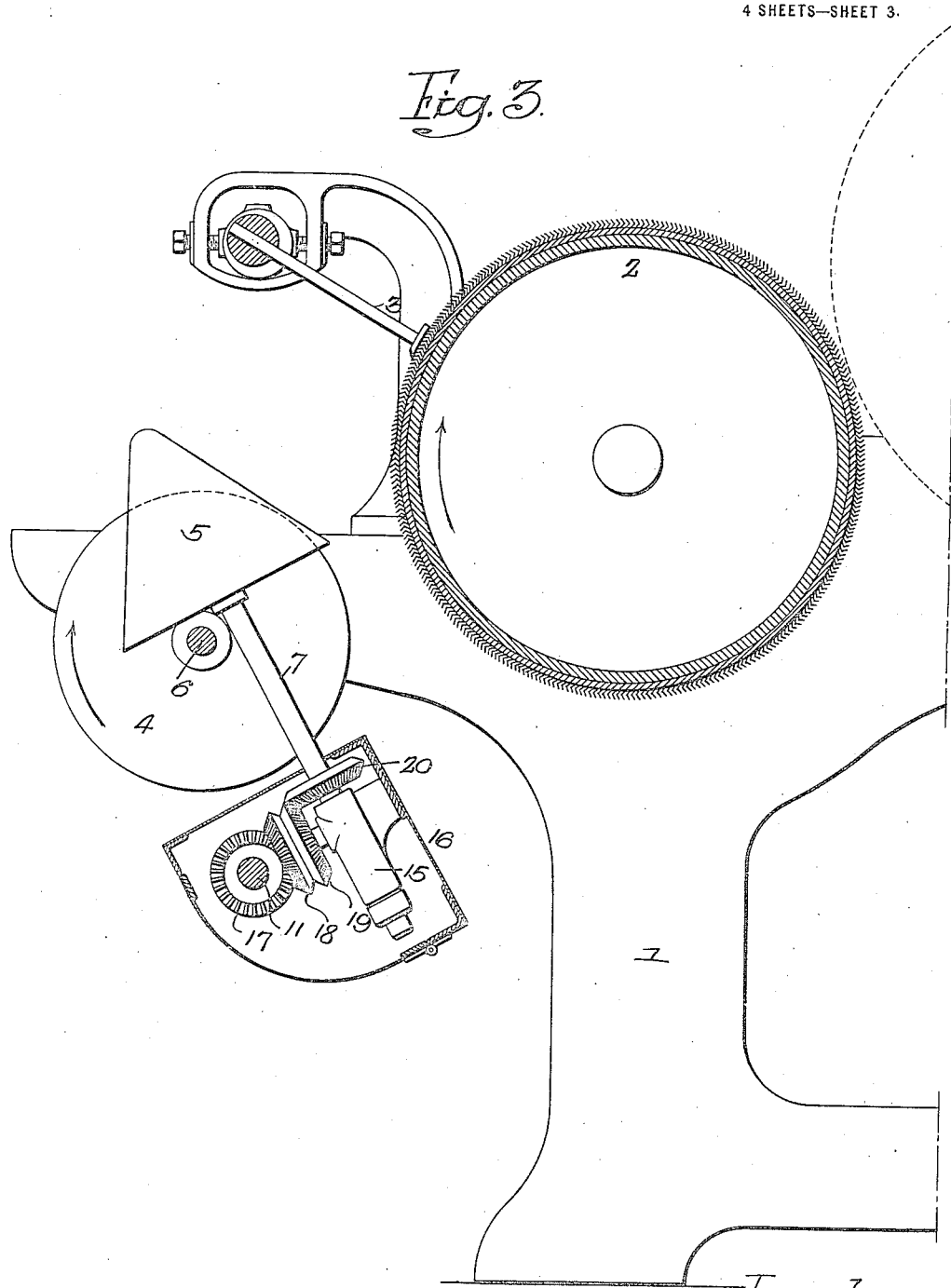

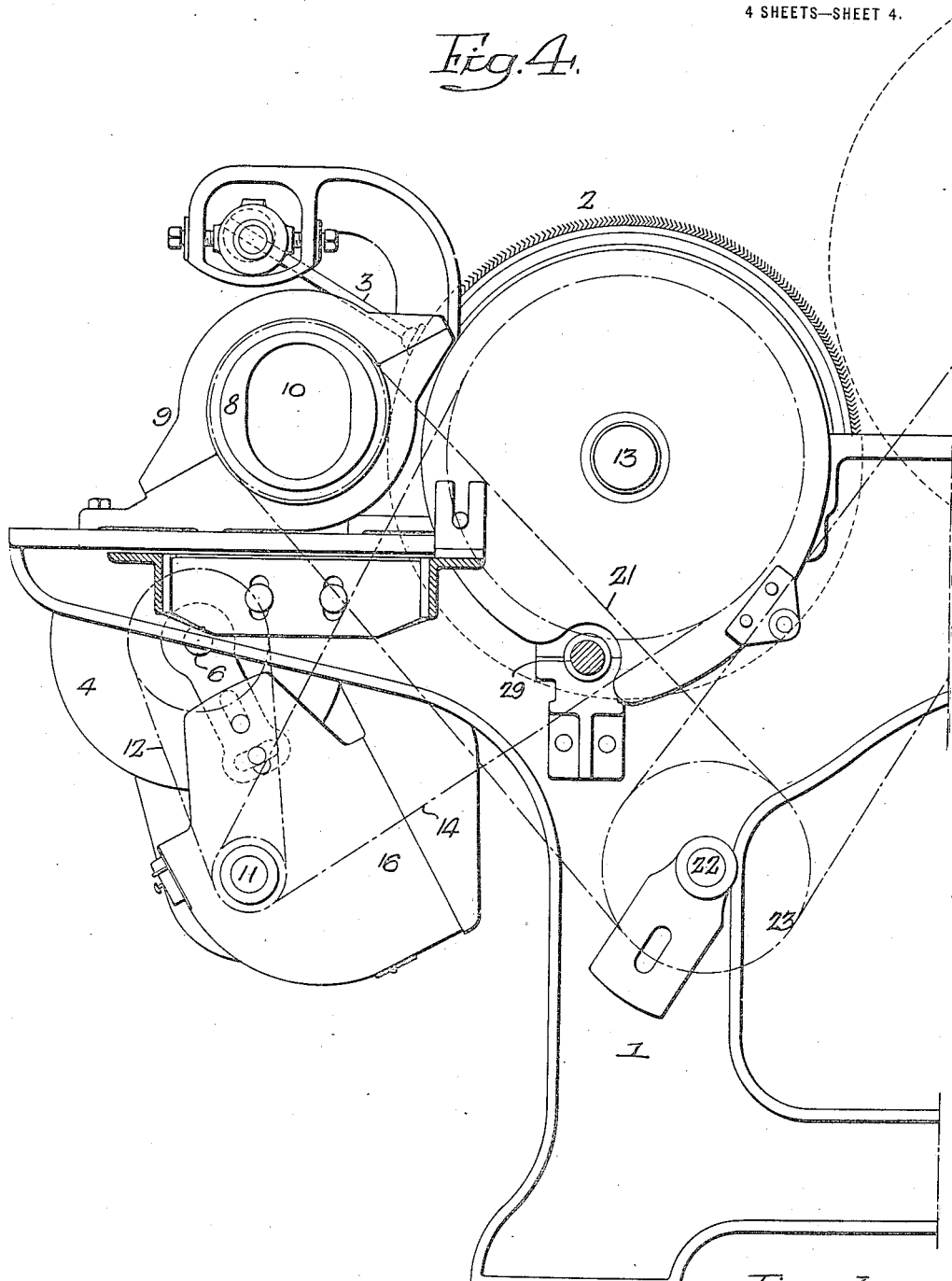

UNITED STATES PATENT OFFICE.

JAMES BOOTH, ANDREW J. MILLER, AND WILLIAM F. BOKUM, OF PHILADELPHIA, PENNSYLVANIA, ASSIGNORS TO SMITH AND FURBUSH MACHINE COMPANY, OF PHILADELPHIA, PENNSYLVANIA, A CORPORATION OF PENNSYLVANIA.

MACHINE FOR MAKING COTTON FELT.

1,287,848.   Specification of Letters Patent.   Patented Dec. 17, 1918.

Application filed September 7, 1916. Serial No. 118,881.

*To all whom it may concern:*

Be it known that we, JAMES BOOTH, ANDREW J. MILLER, and WILLIAM F. BOKUM, citizens of the United States, and residents of Philadelphia, county of Philadelphia, State of Pennsylvania, have invented certain Improvements in Machines for Making Cotton Felt, of which the following is a specification.

Our invention relates to certain improvements in machines for producing cotton filling for use in upholstery and especially for filling the backs of automobile seats.

The object of our invention is to produce a sliver of comparatively large diameter and to partially twist this sliver so as to strengthen it, in order that it may be handled and, when used for the filling for the backs or cushions of seats, it can be broken off in sections and the sections placed in the back or cushion.

In the accompanying drawings:—

Figure 1, is a rear end view of our improved machine for making cotton fillings for upholstery;

Fig. 2, is a view looking in the direction of the arrow, Fig. 1, drawn to an enlarged scale;

Fig. 3, is a sectional view drawn to an enlarged scale on the line 3—3, Fig. 1;

Fig. 4, is a sectional view drawn to an enlarged scale on the line 4—4, Fig. 1; and Fig. 5, is a perspective diagram view illustrating the formation of the filling.

Referring to Figs. 1, 3 and 4 of the drawings, 1 is the frame of a garnet machine in the present instance. 2 is the doffing cylinder of the machine having the usual card clothing. 3 is the comb reciprocated in the ordinary manner for removing the cotton from the doffing cylinder. This cotton comes off in a sliver and rests on the two sets of rolls 4 and 5. The rolls 4 are of an even diameter throughout and are mounted on the rotating shaft 6 and tend to roll the cotton in a round sliver. The rolls 5 are conical in cross section and are mounted on the shaft 7 and rotate in the direction of the arrow, Fig. 1, so as to feed the sliver toward the twisting head.

8 is the twisting head mounted in a bearing 9 and driven by any suitable means. The opening 10 in the twisting head is oblong in cross section so as to engage the mass of cotton as it is fed through the head, and as the head rotates it will give a partial twist to the sliver; the twist being sufficient to hold the fibers of the sliver together so that it can be handled. The twist is not sufficient to destroy the springiness of the mass and, when used for filling seat backs, it will have a certain amount of elasticity.

We have not shown in detail the mechanism for driving the doffing cylinder or the doffing comb, as this is common in this type of machine. The shaft 6 on which the rolls 4 are mounted is driven from a shaft 11 mounted in suitable bearings, preferably by a chain 12, shown by dotted lines, Fig. 4; the shaft 11 being driven, in the present instance, from the shaft 13 of the doffing cylinder by a belt 14, also shown by dotted lines, Fig. 4, but other means of driving the shaft 11 may be resorted to without departing from the essential features of the invention.

The shafts 7 are mounted in bearings 15 within the casing 16 inclosing the shaft 11 and are driven from said shaft 11 through bevel gears 17 and 18, and 19 and 20, as clearly shown in Fig. 3. The twisting head 8 is driven by a belt 21 from a shaft 22, the belt passing around a pulley 23 on said shaft and around the flanged portion of the twisting head. This twisting head rotates slowly so that as the sliver is fed through the twisting head it will be given a partial twist to add sufficient strength to the sliver in order that it may be readily handled and to give it the proper form so that it can be easily stuffed in a seat back.

In order to calender and condense the sliver after it has been twisted, we provide four rolls 24, 24ª, 25 and 26, in the present instance, which are mounted in housings 27 at one end of the machine beyond the table 28 in front of the twisting head 8. The passes in these rolls may be of any shape desired, according to the final shape of the stuffing as, in some instances, the stuffing may be round, while in other cases it may be slightly oval in cross section, according to the character of the back and, in some instances, it may be flat where it is desired to provide a flat sliver for padding the edges of seats and backs.

The rolls, in the present instance, are driven from a shaft 29 through change speed gears 30 and each of the rolls has a gear wheel 31. The several gear wheels mesh so that the rolls will be turned in the proper direction. In some instances, it is desirable to condense the sliver and unite the fibers after the sliver passes through calender rolls, therefore, we provide a second head 32, of the same construction as the twisting head 8, which acts as a guide for the sliver and which is located on the frame 33 shown in Fig. 1 and directly in front of the spooling device.

On the frame 33 are two rolls 36 and 37 geared together. 38, 38 are guides in which the mandrel 39 of a spool is mounted so that as a sliver comes from the twisting head 32 it is wound upon the spool until the spool reaches the desired diameter, when the sliver is broken and removed and an empty spool is substituted for it.

By providing the gearing shown in Fig. 3 between the shaft 7 and the driving shaft 11, we are enabled to adjust the conical rolls to any position desired, so as to increase or reduce the feed or to accommodate slivers of different sizes. The material from which these slivers are made is, in most instances, short staple cotton which has but little strength, consequently, the sliver is rolled in cylindrical form by the action of the rolls 4 and the doffing cylinder 2, but it has not sufficient strength to be drawn forward by the ordinary feed rolls, but by locating the conical rolls 5 between the rolls 4 we are enabled to feed the delicate sliver forward to the twisting head and as soon as a partial twist is given to the sliver it has sufficient strength to be further handled in the calendering rolls and in balling.

While we have illustrated our invention in connection with a garnet machine, it will be understood that the invention can be used in connection with a carding machine, if desired. The sliver produced on this machine is broken off in proper lengths and located in the cavities formed in the leather facing of the back of an automobile seat, for instance, then a burlap backing is applied and the buttons are secured by prongs or by sewing to the back at intervals, the prongs extending through the leather and the burlap. This back section is then placed against the springs, which are first located in position, after which the edges of the back section are secured to the frame. The result is that we obtain an even distribution of the fibrous filling, which can be quickly and accurately applied.

By using the variable speed gears 30 at the calendering rolls, we can regulate the weight of the sliver, which depends upon the travel of the sliver through the machine.

The operation is as follows:—The fibers of cotton as they are combed from the doffing roll accumulate to form the sliver which is slightly twisted due to the rotation of the twisting head 8 and the coöperation therewith of the rolls 4. It will be understood that the sliver as it accumulates on the rolls 4 and 5 is free to rotate with the twisting head, while that portion of the sliver which is passed through the twisting head is held by the calendering rolls 24 and 24ª. The rolls 4 rotate in the direction indicated in Fig. 3, while the conical rolls 5 rotate in the direction indicated in Fig. 1, so that the sliver is rolled into cylindrical form at the same time that it is fed forward and given the slight twist necessary, as it will be understood that this sliver is exceedingly tender and will pull apart unless it is condensed and twisted sufficiently to give it the strength desired.

The sliver which leaves the twisting head, as stated, passes to the calendering and condensing rolls and as it passes between these rolls it is gradually decreased in size and given a finish in order that it may be properly handled. In some instances, as hereinbefore stated, the sliver passes through a head or guide 32, similar in construction to the twisting head 8, which tends to unite the fibers. Then it is wound upon a spool.

The change speed gearing at the calendering and condensing rolls enables us to regulate the feed of the sliver through the machine, so that a given length of sliver can have more or less weight.

We claim:—

1. The combination of a garnet or like machine having a doffing cylinder and a doffing comb; a series of rotating rolls located at the rear of the doffing cylinder, said rolls being of an even diameter throughout; a series of conical feeding rolls located between the first mentioned rolls; and a twisting head at the discharge end of the machine so that the fiber, as it is combed from the doffing cylinder, is rolled into a sliver and is fed forward and given a partial twist.

2. The combination of a garnet or like machine having a doffing cylinder and a doffing comb; a horizontal shaft located at the rear of the doffing cylinder; a series of rolls mounted on the shaft, said rolls being spaced apart; a series of inclined shafts located at right angles to the horizontal shaft; conical rolls mounted on the said shafts, said rolls alternating with the first mentioned rolls; means for imparting movement to the rolls; a twisting head at one side of the machine; and means for rotating said twisting head so that the sliver, as it is formed, will be rolled and fed forward and given a partial twist as it is discharged from the machine.

3. The combination of a garnet or like machine having a doffing cylinder and a doffing comb; a horizontal shaft located at the rear of the said cylinder; a series of rolls on the shaft, said rolls being spaced apart; means for driving the shaft; a series of inclined shafts extending between the rolls; conical rolls mounted on the inclined shafts; a driving shaft; gearing between the driving shaft and the inclined shafts arranged so that the said inclined shafts can be adjusted; a twisting head at one side of the machine; and means for rotating said twisting head.

4. The combination of a garnet or like machine having a doffing cylinder and a doffing comb; a series of horizontal rolls and a series of conical rolls alternating with the horizontal rolls; means for driving both sets of rolls; a twisting head through which the sliver is fed; means for rotating said twisting head; a series of calendering rolls through which the sliver is passed; and means for turning said calendering rolls.

5. The combination of a garnet or like machine having a doffing cylinder and a doffing comb; a series of horizontal rolls and a series of conical rolls alternating with the horizontal rolls; means for driving both sets of rolls; a twisting head through which the sliver is fed; means for rotating said twisting head; a series of calendering rolls between which the sliver is passed; means for turning said calendering rolls; a second head for further uniting the slivers located beyond the calendering rolls; and winding mechanism carrying a spool on which the sliver is wound.

6. The combination in a machine for producing stuffing for upholstery, of means for producing a series of fibers having a doffing roll and comb for removing the fibers from said doffing roll; a twisting head; rolls mounted on a shaft parallel with the doffing cylinder and arranged to roll the sliver in cylindrical form; a series of conical rolls located between the first mentioned rolls for giving the forward movement to the sliver; a stand of calendering and condensing rolls; means for driving said rolls; and change speed gearing between said rolls and the first mentioned mechanism whereby the speed of travel of the sliver can be regulated to increase or decrease the weight thereof.

JAMES BOOTH.
ANDREW J. MILLER.
WILLIAM F. BOKUM.